United States Patent
Huang et al.

(10) Patent No.: US 10,805,033 B2
(45) Date of Patent: Oct. 13, 2020

(54) OPTICAL LINE TERMINAL, AND SIGNAL TRANSMISSION METHOD AND DEVICE

(71) Applicant: ZTE CORPORATION, Shenzhen, Guangdong (CN)

(72) Inventors: Xingang Huang, Guangdong (CN); Bo Yang, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/313,034

(22) PCT Filed: Aug. 15, 2017

(86) PCT No.: PCT/CN2017/097474
§ 371 (c)(1),
(2) Date: Dec. 23, 2018

(87) PCT Pub. No.: WO2017/220040
PCT Pub. Date: Dec. 28, 2017

(65) Prior Publication Data
US 2019/0165878 A1    May 30, 2019

(30) Foreign Application Priority Data
Jun. 24, 2016 (CN) .......................... 2016 1 0474783

(51) Int. Cl.
*H04J 14/02* (2006.01)
(52) U.S. Cl.
CPC .......... *H04J 14/0289* (2013.01); *H04J 14/02* (2013.01); *H04J 14/0212* (2013.01); *H04J 14/0239* (2013.01); *H04J 14/0245* (2013.01); *H04J 14/0249* (2013.01)

(58) Field of Classification Search
CPC .... H04J 14/02; H04J 14/0212; H04J 14/0239; H04J 14/0245; H04J 14/0249; H04J 14/0289
USPC .................................................. 398/43, 67–72
See application file for complete search history.

(56) References Cited

U.S. PATENT DOCUMENTS

| 6,040,914 | A | * | 3/2000 | Bortz | G01J 3/433 250/345 |
| 8,521,025 | B2 | * | 8/2013 | Ansari | H04J 14/0282 398/58 |
| 8,953,942 | B1 | * | 2/2015 | Lam | H04J 14/0282 398/68 |
| 9,112,613 | B2 | * | 8/2015 | Kim | H04J 14/0247 |
| 9,853,761 | B2 | * | 12/2017 | Cavaliere | H04J 14/0227 |
| 10,027,405 | B2 | * | 7/2018 | Geng | H04B 10/032 |
| 10,063,411 | B2 | * | 8/2018 | Khotimsky | H04L 41/0806 |
| 2006/0153567 | A1 | * | 7/2006 | Kim | H04J 14/0294 398/72 |
| 2013/0209105 | A1 | * | 8/2013 | Jeong | H04J 14/0246 398/72 |
| 2013/0223841 | A1 | * | 8/2013 | Lee | H04J 14/0235 398/72 |

(Continued)

*Primary Examiner* — Amritbir K Sandhu
(74) *Attorney, Agent, or Firm* — Li & Cai Intellectual Property (USA) Office

(57) ABSTRACT

Disclosed is an optical line terminal (OLT), including: N tunable modules, each of the N tunable modules include M tunable transmitters, the number of tuning channels of the M tunable transmitters is greater than or equal to two and the number of the tuning channels is less than M×N, wherein N and M are integers greater than or equal to two.

16 Claims, 11 Drawing Sheets

(56) References Cited

U.S. PATENT DOCUMENTS

| | | | |
|---|---|---|---|
| 2015/0010305 A1* | 1/2015 | Effenberger | H04Q 11/0005 |
| | | | 398/48 |
| 2015/0125153 A1* | 5/2015 | Lee | H04B 10/07957 |
| | | | 398/79 |
| 2015/0244494 A1* | 8/2015 | Grobe | H04J 14/025 |
| | | | 398/68 |
| 2019/0165878 A1* | 5/2019 | Huang | H04J 14/0245 |
| 2020/0106543 A1* | 4/2020 | Jiang | H04L 5/0048 |

* cited by examiner determine that an OLT comprises N tunable modules, wherein each of the N tunable modules includes M tunable transmitters, the number of tuning channels of the M tunable transmitters is greater than or equal to two and less than M×N, wherein N and M are integers greater than or equal to two — S902 transmit signals according to the determined N tunable modules — S904

OPTICAL LINE TERMINAL, AND SIGNAL TRANSMISSION METHOD AND DEVICE

CROSS-REFERENCE TO RELATED APPLICATIONS

This is a National Phase Application filed under 35 U.S.C. 371 as a national stage of PCT/CN2017/097474, filed on Aug. 15, 2017, an application claiming the priority of Chinese Patent Application No. 201610474783.6, filed on Jun. 24, 2016, the contents of which are incorporated herein in their entirety by reference.

TECHNICAL FIELD

The present disclosure relates to, but is not limited to, the field of communications, and in particular, to an optical line terminal (OLT), a signal transmission method, and a device.

BACKGROUND

In recent years, as bandwidth requirements of access network users continue to increase, the optical access technology for passive optical network (PON) is gradually transiting from traditional time division multiplexing (TDM) technology to wavelength division multiplexing (WDM) technology. Multi-wavelength passive optical networks, such as WDM-PON and TWDM-PON, can meet high bandwidth requirement by increasing the uplink and downlink wavelength pairs and adopting multiplexing technology or hybrid multiplexing technology of wavelength division and time division. WDM-PON not only has the advantages of abundant bandwidth, but also has small delay and high security. It has its unique advantages in disclosure scenarios such as wireless bearers or private network users.

A typical WDM-PON system is composed of an optical line terminal (OLT), an optical distribution network (ODN), and an optical network unit (ONU). The OLT mainly includes a multi-wavelength light emitting unit, an optical receiver, and a wavelength division Multiplexer/Demultiplexer (MUX/DMUX) device. The multi-wavelength downlink optical signal in the OLT is multiplexed by the MUX device and transmitted to the ODN via a backbone fiber, and then is demultiplexed by a WDM device at the ODN to different ONUs. WDM devices at the ODN typically employ an arrayed waveguide grating (AWG) which is temperature-insensitive. The uplink optical signals of different wavelengths transmitted by each ONU are multiplexed by the WDM device at the ODN, transmitted to the OLT through the backbone optical fiber, and demultiplexed by a DMUX device in the OLT to corresponding receivers.

In a WDM-PON system, an OLT multi-wavelength light source can be implemented by a fixed wavelength laser or a laser array (such as a distributed feedback (DFB) laser array). When a fixed-wavelength laser is used, optical modules of various wavelengths needs to be prepared since each user corresponds to a specific pair of wavelengths, this is difficult to maintain and has high storage cost. In this regard, wavelength adaptive schemes such as external-seeded injection locking and self-seeded injection locking are proposed, such as in a Chinese patent No. 200880122201.1 titled "Wavelength division multiplexing-passive optical network (WDM-PON) using external seed light source". In a paper titled "Demonstration of CPRI" In the self-seeded WDM-PON in Commercial LTE Environment" in OFC 2015M2J.6, a WDM-PON OLT adopts an external-seeded injection scheme and a self-seed injection scheme, and a single-channel module or multi-channel module described therein has a wavelength adaptive function and does not require multiple wavelengths. However, the external-seeded injection scheme and the self-seeded injection scheme are limited by factors such as relative noise intensity or device modulation bandwidth, and are difficult to support transmission rates above 10 G. The use of the wavelength tunable module is another implementation scheme in which the wavelength can be flexibly configured to realize the singularity of the WDM-PON PON port module. As shown in FIG. 1, in a WDM-PON network architecture based on the tunable transmitter described in a Chinese patent No. 2009102595716, an OLT uses multiple bidirectional single-fiber tunable optical modules to implement the wavelength flexible configuration. However, the wavelength configuration by using the WDM-PON OLT device based on multiple single-channel tunable optical modules has the following problems: when performing wavelength configuration on the tunable optical module in the OLT device, the requirement for tuning range of the tunable optical module is very large, and the cost is very high.

SUMMARY

The following is an overview of topics described in detail herein. This summary is not intended to limit the scope of the claims.

Embodiments of the present disclosure provide an optical line terminal (OLT), a signal transmission method, and a device, which are configured to reduce the tuning range when the tunable module in the OLT performs wavelength configuration.

According to an aspect of the present disclosure, an OLT is provided, applied to a wavelength division multiplexing passive optical network with M×N pairs of uplink and downlink wavelengths, including N tunable modules, each of the N tunable modules includes M tunable transmitters, the number of tuning channels of the M tunable transmitters is greater than or equal to two and the number of the tuning channels is less than M×N, wherein N and M are integers greater than or equal to two.

In an exemplary embodiment, the N tunable modules may be the same, and wherein the number of tuning channels of the M tunable transmitters of each tunable module is greater than or equal to N and the number of the tuning channels is less than M×N.

In an exemplary embodiment, each of the tunable modules may further include: M receivers configured to receive M uplink signals corresponding to M downlink signals transmitted by the M tunable transmitters in the tunable module.

In an exemplary embodiment, the tunable module may further include a wavelength division multiplexing-demultiplexing unit, including: a first wavelength division multiplexer configured to perform wavelength division multiplexing on the M downlink signals transmitted by the M tunable transmitters, and a second wavelength division multiplexer configured to perform wavelength division demultiplexing on the M uplink signals corresponding to the M downlink signals.

In an exemplary embodiment, the second wavelength division multiplexer may further include: an optical switching device configured to provide protection for M ports.

In an exemplary embodiment, the wavelength division multiplexing-demultiplexing unit may further include a wavelength division multiplexer-demultiplexer configured to perform wavelength division multiplexing-demultiplexing on the downlink signals after the wavelength division multiplexing and the uplink signals before the wavelength division demultiplexing, wherein the wavelength division multiplexer-demultiplexer is connected to the first wavelength division multiplexer and the second wavelength division multiplexer.

In an exemplary embodiment, the OLT may further include a wavelength division multiplexing-demultiplexing module configured to perform wavelength division multiplexing-demultiplexing on the uplink and downlink signals of the N tunable modules, wherein the wavelength division multiplexing-demultiplexing module is connected to the N tunable modules.

In an exemplary embodiment, the wavelength division multiplexing-demultiplexing module may further include: an optical branching device configured to perform port protection between the N tunable modules, wherein the M receivers are tunable receivers.

According to another aspect of the present disclosure, a signal transmission method is provided, which includes steps of: determining that an optical line terminal OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two; and transmitting signals according to the determined N tunable modules.

In an exemplary embodiment, the N tunable modules are the same when the number of tuning channels of the M tunable transmitters of each tunable module is greater than or equal to N and the number of the tuning channels is less than M×N.

In an exemplary embodiment, the step of transmitting signals according to the determined N tunable modules may include at least one of: performing wavelength division multiplexing on the M downlink signals transmitted by the M tunable transmitters of each tunable module, and performing wavelength division demultiplexing on the M uplink signals corresponding to the M downlink signals.

In an exemplary embodiment, the step of performing wavelength division demultiplexing on the M uplink signals corresponding to the M downlink signals may include: protecting, by using an optical switching device, M ports that receive the M uplink signals.

In an exemplary embodiment, the step of transmitting signals according to the determined N tunable modules may further include: performing wavelength division multiplexing-demultiplexing on the downlink signals after the wavelength division multiplexing and the uplink signals before the wavelength division demultiplexing.

In an exemplary embodiment, the step of transmitting signals according to the determined N tunable modules may further include: performing wavelength division multiplexing-demultiplexing on the uplink and downlink signals of the N tunable modules.

In an exemplary embodiment, upon tunable reception of the M uplink signals corresponding to the M downlink signals, port protection is performed between the N tunable modules by an optical branching device.

According to another aspect of the present disclosure, a signal transmission device located in the OLT is provided, which includes: a determining module, configured to determine that the OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two; and a transmitting module, configured to transmit signals according to the determined N tunable modules.

According to another aspect of the present disclosure, a tunable module is provided, including: M tunable transmitters, the number of tuning channels of the M tunable transmitters is greater than or equal to two and the number of the tuning channels is less than M×N, wherein N and M are integers greater than or equal to two.

In an exemplary embodiment, the tunable module may further include: M receivers, configured to receive M uplink signals corresponding to M downlink signals transmitted by the M tunable transmitters in the tunable module.

In an exemplary embodiment, the tunable module may further include a wavelength division multiplexing-demultiplexing unit, which includes: a first wavelength division multiplexer configured to perform wavelength division multiplexing on the M downlink signals transmitted by the M tunable transmitters, and a second wavelength division multiplexer configured to perform wavelength division demultiplexing on the M uplink signals corresponding to the M downlink signals.

According to another aspect of the present disclosure, a storage medium is provided. The storage medium is configured to store program codes for performing steps of: determining that an optical line terminal OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two; and transmitting signals according to the determined N tunable modules.

In an exemplary embodiment, the storage medium may further be configured to store program codes for performing a step of: the N tunable modules are the same when the number of tuning channels of the M tunable transmitters of each tunable module is greater than or equal to N and the number of the tuning channels is less than M×N.

In an exemplary embodiment, the storage medium may further be configured to store program codes for performing a step of: the step of transmitting signals according to the determined N tunable modules includes at least one of: performing wavelength division multiplexing on the M downlink signals transmitted by the M tunable transmitters of each tunable module, and performing wavelength division demultiplexing on the M uplink signals corresponding to the M downlink signals.

In an exemplary embodiment, the storage medium may further be configured to store program codes for performing a step of: the step of performing wavelength division demultiplexing on the M uplink signals corresponding to the M downlink signals includes: protecting, by using an optical switching device, M ports that receive the M uplink signals.

In an exemplary embodiment, the storage medium may further be configured to store program codes for performing a step of: the step of transmitting signals according to the determined N tunable modules further includes: performing wavelength division multiplexing-demultiplexing on the downlink signals after the wavelength division multiplexing and the uplink signals before the wavelength division demultiplexing.

In an exemplary embodiment, the storage medium may further be configured to store program codes for performing a step of: the step of transmitting signals according to the determined N tunable modules further includes: performing wavelength division multiplexing-demultiplexing on the uplink and downlink signals of the N tunable modules.

In an exemplary embodiment, the storage medium may further be configured to store program codes for performing a step of: performing, by an optical branching device, port protection between the N tunable modules upon tunable reception of the M uplink signals corresponding to the M downlink signals.

According to embodiments of the present disclosure, the OLT includes N tunable modules, each of the N tunable modules includes M tunable transmitters, the number of tuning channels of the M tunable transmitters is greater than or equal to two and the number of the tuning channels is less than M×N, wherein N and M are integers greater than or equal to two. Each tunable module in the OLT is a multi-channel tunable module, and a number of wavelength tuning channels shared by each tunable transmitter in each tunable module are reduced, thus the tuning range of each tunable transmitter is reduced. Additionally, a transmitter with a small wavelength tuning range is used for each of the transmitters, therefore, when the OLT adopts tunable modules for wavelength configuration to reduce the number of module specifications, the tuning range may be reduced, and an effect of implementing flexible wavelength configuration at a low cost can be realized. Further, the above-mentioned multi-channel tunable module device has a high degree of integration, which is advantageous for increasing port density of a system and improving system capacity.

Other aspects will be apparent upon reading and understanding the drawings and detailed description.

BRIEF DESCRIPTION OF THE DRAWINGS

FIG. 6 (b) is a structural diagram of WDM 2 in the exemplary structure diagram 2 of the passive optical network device of the OLT according to an embodiment of the present disclosure;

DETAILED DESCRIPTION

The present disclosure will be described in detail below with reference to the drawings in conjunction with embodiments. It should be noted that the embodiments in the present disclosure and the features in the embodiments may be combined with each other without conflict.

It should be noted that the terms "first", "second" and the like in the description and claims and the above-mentioned drawings of the present disclosure are used to distinguish between similar objects, and are not necessarily used to describe a specific sequence or order.

An embodiment provides an optical line terminal (OLT), which adopts a tunable transmitter with a small wavelength tuning range and a low cost, can use tunable modules with a same tuning range or a few different wavelength tuning ranges, which can implement flexible wavelength configuration of WDM-PON OLT devices.

Figure 1:
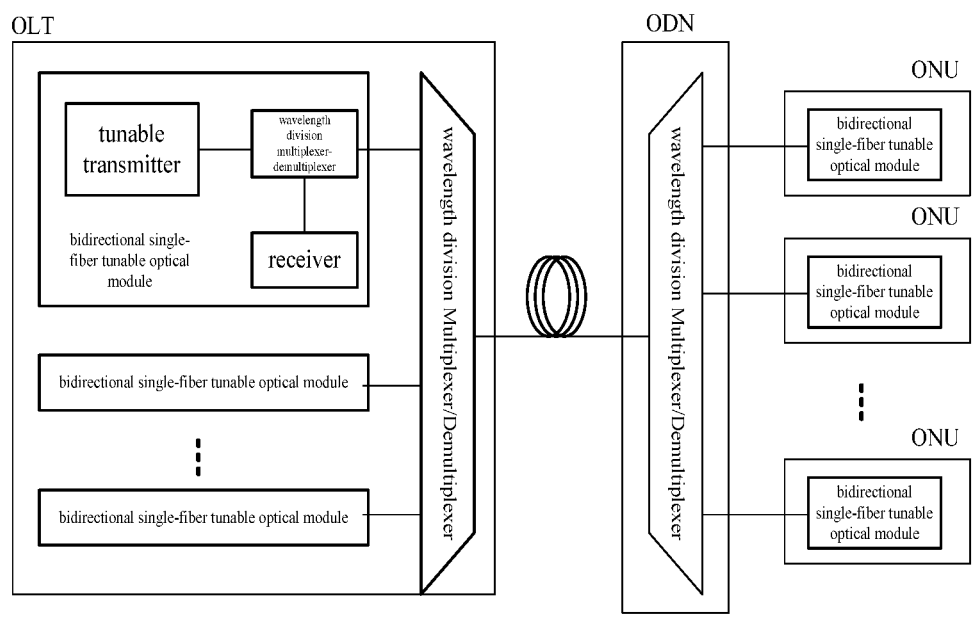
FIG. 1 is a WDM-PON network architecture based on a tunable transmitter.
Figure 2:
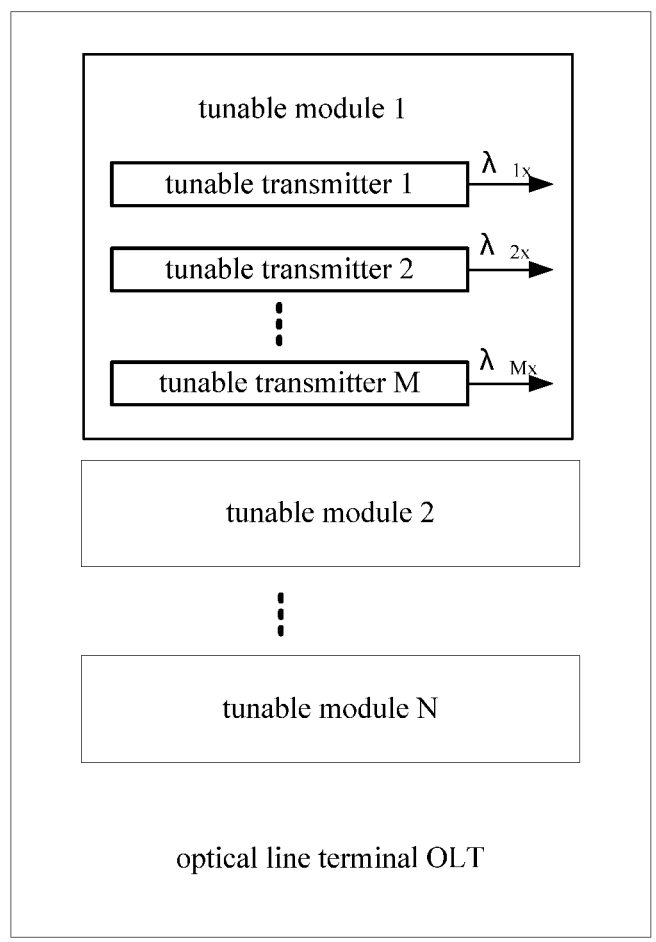
FIG. 2 is a structural diagram of an OLT according to an embodiment of the present disclosure.

FIG. 2 is a structural diagram of an OLT according to an embodiment. As shown in FIG. 2, the OLT includes N tunable modules, each of the N tunable modules include M tunable transmitters, the number of tuning channels of the M tunable transmitters is greater than or equal to two and the number of the tuning channels is less than M×N, wherein N and M are integers greater than or equal to two.

Through the above structure, each tunable module in the OLT is a multi-channel tunable module, and the number of wavelength tuning channels shared by each tunable transmitter in each tunable module is reduced, thus the tuning range of each tunable transmitter is reduced. Additionally, a transmitter with a small wavelength tuning range is used for each of the transmitters, therefore, when the OLT adopts tunable modules for wavelength configuration to reduce the number of module specifications, the tuning range may be reduced, and an effect of implementing flexible wavelength configuration at a low cost can be realized. Further, the above-mentioned multi-channel tunable module device has a high degree of integration, which is advantageous for increasing port density of a system and improving system capacity.

Exemplarily, the OLT may employ N identical tunable modules when the number of tuning channels of the M tunable transmitters of each tunable module is greater than or equal to N and the number of the tuning channels is less than M×N. Through the above steps, when the same tunable modules are used for flexible configuration of the wavelength to reduce the number of module specifications, the tuning range of the tunable module can be reduced, and the effect of implementing flexible wavelength configuration by using the same tunable modules can be realized at a low cost.

The tunable transmitter may include a tunable laser, an amplifier and an isolator, wherein the M tunable lasers of the M tunable transmitters may employ two or more kinds of tunable lasers with a small tuning range of wavelength, and the number of tuning channels of each kind the tunable lasers is greater than or equal to 2 and less than M×N. In a tunable module, the sum of the tunable ranges of the two or more kinds of tunable lasers is greater than or equal to the range of all downlink wavelength channels. For example, for M×N consecutive downlink wavelength channels $\lambda_{11}$, $\lambda_{12}, \ldots, \lambda_{1N}, \lambda_{21}, \lambda_{22}, \ldots, \lambda_{2N}, \ldots, \lambda_{M1}, \lambda_{M2}, \ldots, \lambda_{MN}$, the tuning range of the tunable transmitter 1 in the tunable module is ($\lambda_{11}, \lambda_{12}, \ldots, \lambda_{1N}$), that is, the tunable transmitter 1 includes a tunable laser 1 with N wavelength channels tunable; the tuning range of the tunable transmitter 2 is ($\lambda_{21}$, $\lambda_{22}, \ldots, \lambda_{2N}$), that is, the transmitter 2 includes a tunable laser 2 with N wavelength channels tunable, and so on; the tuning range of the tunable transmitter M is ($\lambda_{M1}$, $\lambda_{M2}, \ldots, \lambda_{MN}$), that is, the tunable transmitter M includes a tunable laser M with N wavelength channels tunable; thereby, flexible configuration of all downlink wavelength channels can be achieved by using the OLT with multiple tunable modules. The multiple tunable modules are the same, and the module uses a tunable laser with a small wavelength tuning range. For example, the tunable laser can be a distributed Bragg reflector (DBR) laser, a distributed feedback (DFB) laser, a vertical cavity surface emitting laser (VCSEL), an external cavity laser (ECL) and other devices which is tunable. Furthermore, the tunable lasers 1 to M can be a multiple discrete tunable lasers or arrayed multi-channel tunable lasers.

Exemplarily, the tunable module may further include: M receivers configured to receive the M uplink signals corresponding to the M downlink signals transmitted by the M tunable transmitters in the tunable module. Exemplarily, the above M receivers may include a fixed receiver or a tunable receiver, wherein when the receivers are tunable receivers, each of the receivers may further include a tunable filter configured to filter the uplink signals received by the receiver. Through the above structure, unwanted signals mixed in the received uplink signals may be filtered out, and accuracy of reception may be improved.

Figure 3:
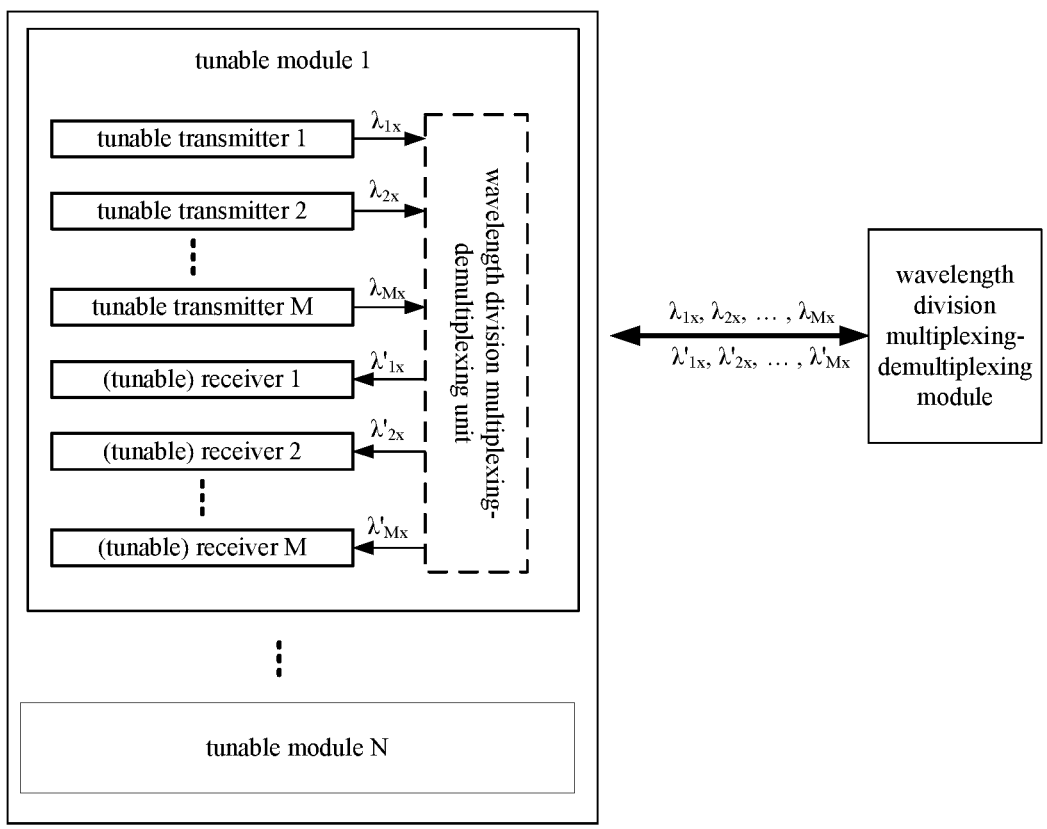
FIG. 3 is an exemplary structural diagram of an OLT according to an embodiment of the present disclosure.

FIG. 3 is an exemplary structural diagram of an OLT according to an embodiment of the present disclosure. As shown in FIG. 3, the tunable module may further include a wavelength division multiplexing-demultiplexing unit including: a first wavelength division multiplexer configured to perform wavelength division multiplexing on the M downlink signals transmitted by the M tunable transmitters, and a second wavelength division multiplexer configured to perform wavelength division demultiplexing on the M uplink signals corresponding to the M downlink signals. Through the above structure, the wavelength division multiplexing-demultiplexing unit is disposed inside the tunable module, thus the uplink and downlink signals inside the tunable module can be multiplexed and demultiplexed to reduce the number of fiber connected between the tunable module and a wavelength division multiplexing-demultiplexing module (the wavelength division multiplexing-demultiplexing module is a component of the OLT, used for wavelength division multiplexing-demultiplexing of uplink and downlink signals of multiple tunable modules), to achieve further cost reduction. Exemplarily, the wavelength division multiplexing-demultiplexing unit may include one or more thin film filters, arrayed waveguide gratings, optical splitters, circulators, optical switches, and the like.

Exemplarily, the second wavelength division multiplexer may include an optical switching device configured to provide protection for M ports that receive M uplink signals. Through the above structure, when an optical transceiving link of a certain tunable module in the OLT device fails, another optical transceiving link (a channel of the M channels) of the current tunable module can be enabled without replacing the current tunable module, to restore optical connection between the OLT and the ONU. As such, the wavelength signal transmitted on the failed channel can be transmitted on other channels of the tunable module, ensuring the reliability of the transmission, and greatly improving the utilization of the multi-channel tunable module and reducing the operating cost. Moreover, as compared to port protection by double device, the port protection by single device reduces the need for devices and optical components and reduces operating cost.

Exemplarily, the multiplexer unit may further include: a wavelength division multiplexer-demultiplexer configured to perform wavelength division multiplexing-demultiplexing on the downlink signals after the wavelength division multiplexing and the uplink signals before the wavelength division demultiplexing, wherein the wavelength division multiplexer-demultiplexer is connected to the first wavelength division multiplexer and the second wavelength division multiplexer.

Exemplarily, as shown in FIG. 3, the OLT may include: a wavelength division multiplexing-demultiplexing module configured to perform wavelength division multiplexing-demultiplexing on the uplink and downlink signals of the N tunable modules, and when the M receivers are tunable receivers, the wavelength division multiplexing-demultiplexing module further includes: an optical branching device configured to protect between the N tunable modules. Through the above structure, when an optical transceiving link of a certain multi-channel tunable module in the OLT device fails, an optical transceiving link of another multi-channel tunable module (any module other than the failed tunable module) of the current OLT device can be enabled without replacing the tunable module, to restore optical connection between the OLT and the ONU. As such, other optical transceiving links of the failed multi-channel tunable module can continue to work, greatly improving the utilization of the multi-channel tunable module and reducing the operating cost. Moreover, as compared to port protection by double device, the port protection by single device reduces the need for devices and optical components and reduces operating cost.

The receiver can use an Avalanche photodiode (APD) or a PIN photodiode (PIN PD) detector to receive a single downlink input wavelength $\lambda'_{11}, \lambda'_{12}, \ldots, \lambda'_{1N}, \lambda'_{21}, \lambda'_{22}, \ldots, \lambda'_{2N}, \ldots, \lambda'_{M1}, \lambda'_{M2}, \ldots,$ or $\lambda'_{MN}$ corresponding to the uplink wavelength. Exemplarily, the receiver may also be a tunable receiver including a tunable filter that filters multiple input uplink wavelength signals; downlink wavelength corresponding to the uplink wavelength may be received by the APD or the PIN detector. The tunable filter described above can be a low-cost filter with narrow tunable range. Exemplarily, receivers 1 to M may be multiple discrete detectors, or arrayed multi-channel detectors.

Exemplarily, the multiple optical devices (e.g., the tunable transmitter, the receiver, the wavelength division multiplexing-demultiplexing unit, the wavelength division multiplexing-demultiplexing module, etc.) included in the tunable module may be a set of multiple discrete devices, or may be composed of several or a single integrated optical chip(s).

Figure 4:
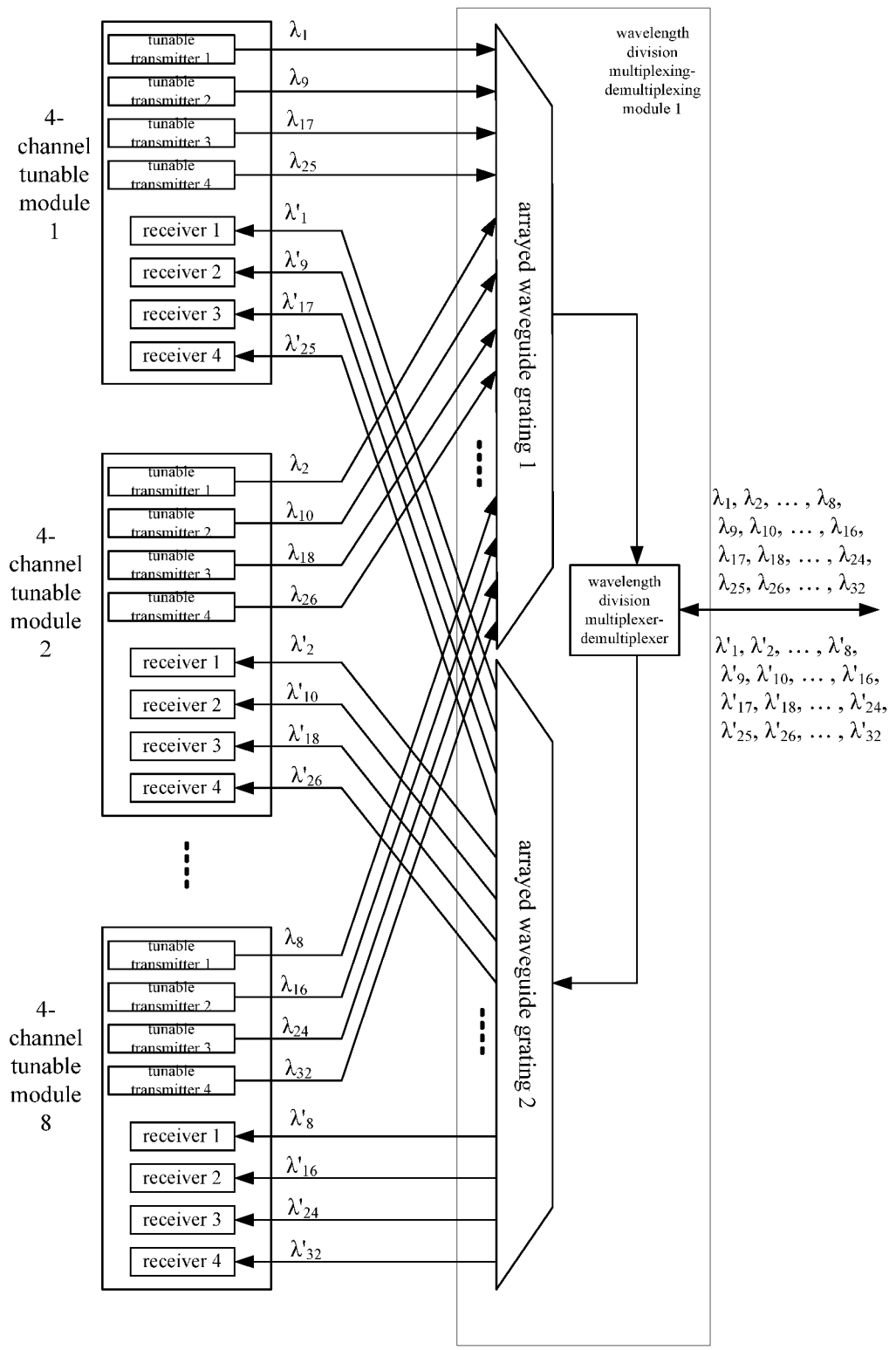
FIG. 4 is an exemplary structural diagram 1 of a passive optical network device of an OLT according to an embodiment of the present disclosure.

FIG. 4 is an exemplary structural diagram 1 of a passive optical network device of an OLT according to an embodiment of the present disclosure. As shown in FIG. 4, the passive optical network device includes eight identical 4-channel tunable modules and a wavelength division multiplexing-demultiplexing module 1, implementing 32-channel downlink wavelength transmission and 32-channel uplink wavelength reception with a single PON port.

The 4-channel tunable module is configured to transmit 4 downlink optical signals and receive 4 uplink optical signals, wherein the transmitting wavelengths transmitted by the 4-channel tunable module can be dynamically allocated according to the networking requirements, and the receiving wavelengths transmitted by the 4-channel tunable module is fixedly distributed by the wavelength division multiplexing-demultiplexing module 1. The 4-channel tunable module includes 4 tunable transmitters and 4 receivers.

The four tunable transmitters described above employ four kinds of tunable lasers with eight channels that are tunable for a small wavelength tuning range, for example, the wavelength tunable range is less than or equal to 8 nm. Within a single module, the tunable range of the four kinds of tunable lasers may cover a range of all 32 downlink wavelength channels. For example, for the 32 continuous downlink wavelength channels $\lambda_1, \lambda_2, \ldots, \lambda_8, \lambda_9, \lambda_{10}, \ldots, \lambda_{16}, \ldots, \lambda_{25}, \lambda_{26}, \ldots, \lambda_{32}$, the tuning range of the tunable transmitter 1 in the 4-channel tunable module is $(\lambda_1, \lambda_2, \ldots, \lambda_8)$, that is, the tunable transmitter 1 includes a tunable laser 1 with eight wavelength channels tunable, the tuning range of the tunable transmitter 2 in the 4-channel tunable module is $(\lambda_9, \lambda_{10}, \ldots, \lambda_{16})$, that is, the tunable transmitter 2 includes a tunable laser 2 with eight wavelength channels tunable, and so on, the tuning range of the tunable transmitter 4 in the 4-channel tunable module is $(\lambda_{25}, \lambda_{26}, \ldots, \lambda_{32})$, that is, the tunable transmitter 4 includes a tunable laser 4 with eight wavelength channels tunable. Therefore, optical channel transmission of all 32 downlink wavelength channels can be realized by corresponding wavelength channel configuration for each module using eight 4-channel tunable modules of a same specification. The 4-channel tunable module can be such configured that the four channels output wavelengths with equal or unequal interval wavelengths, for example, in the first 4-channel tunable module, the tunable transmitter outputs $\lambda_1$, the receiver 2 receives $\lambda_9$, the receiver 3 receives $\lambda_{17}$, and the receiver 4 receives $\lambda_{25}$; in the second 4-channel tunable module, the tunable transmitter outputs $\lambda_2$, the receiver 2 receives $\lambda_{10}$, the receiver 3 receives $\lambda_{18}$, and the receiver 4 receives $\lambda_{26}$; and so on; in the eighth 4-channel tunable module, the tunable transmitter outputs $\lambda_8$, the receiver 2 receives $\lambda_{16}$, the receiver 3 receives $\lambda_{24}$, and the receiver 4 receives $\lambda_{32}$. Alternatively, in the first 4-channel tunable module, the tunable transmitter outputs $\lambda_1$, the receiver 2 receives $\lambda_9$, the receiver 3 receives $\lambda_{24}$, and the receiver 4 receives $\lambda_{32}$; in the second 4-channel tunable module, the tunable transmitter outputs $\lambda_2$, the receiver 2 receives $\lambda_{10}$, the receiver 3 receives $\lambda_{25}$, and the receiver 4 receives $\lambda_{31}$; and so on; in the eighth 4-channel tunable module, the tunable transmitter outputs $\lambda_8$, the receiver 2 receives $\lambda_{16}$, the receiver 3 receives $\lambda_{17}$, and the receiver 4 receives $\lambda_{25}$. The tunable laser used in the tunable module is an 8-channel tunable laser with small tuning range. For example, the tunable laser can be a tunable DBR, a tunable VCSEL, and a tunable ECL. The tunable lasers 1 through 4 can be multiple discrete tunable lasers or arrayed multi-channel tunable lasers.

The above receiver can use a wide spectrum receiving APD or PIN detector to receive an uplink input wavelength $\lambda'_1, \lambda'_2, \ldots, \lambda'_8, \lambda'_9, \lambda'_{10}, \ldots, \lambda'_{16}, \ldots, \lambda'_{25}, \lambda'_{26}, \ldots$, or $\lambda'_{32}$ corresponding to the downlink wavelength. The wavelengths received by different receiving channels are distributed by the wavelength division multiplexing-demultiplexing module 1 to corresponding receivers. For example, in the first 4-channel tunable module, the receiver 1 receives $\lambda'_1$, the receiver 2 receives $\lambda'_9$, the receiver 3 receives $\lambda'_{17}$, and the receiver 4 receives $\lambda'_{25}$; in the second 4-channel tunable module, the receiver 1 receives $\lambda'_2$, the receiver 2 receives $\lambda'_{10}$, the receiver 3 receives $\lambda'_{18}$, and the receiver 4 receives $\lambda'_{26}$; and so on; in the eighth 4-channel tunable module, the receiver 4 receives $\lambda'_8$, the receiver 2 receives $\lambda'_{16}$, the receiver 3 receives $\lambda'_{24}$, and the receiver 4 receives $\lambda'_{32}$. Receivers 1 through 4 can be multiple discrete detectors or arrayed multi-channel detectors.

The multiple optical devices included in the above 4-channel tunable module may be a set of multiple discrete devices, or may be composed of several or a single integrated optical chip(s).

The above 4-channel tunable module and the wavelength division multiplexing-demultiplexing module 1 are connected by a plurality of optical fiber or a ribbon optical fiber. The wavelength division multiplexing-demultiplexing module 1 connects eight 4-channel tunable modules to an ODN network, and performs wavelength division multiplexing-demultiplexing on multiple uplink and downlink signals. The wavelength division multiplexing-demultiplexing module 1 of FIG. 4 includes an arrayed waveguide grating 1, an arrayed waveguide grating 2, and a wavelength division multiplexer-demultiplexer. The arrayed waveguide grating 1 performs wavelength division multiplexing on the 32 downlink optical signals $\lambda_1, \lambda_2, \ldots, \lambda_8, \lambda_9, \lambda_{10}, \ldots, \lambda_{16}, \ldots, \lambda_{25}, \lambda_{26}, \ldots, \lambda_{32}$ input to the multiple ports and transmits to the wavelength division multiplexer-demultiplexer; the arrayed waveguide grating 2 performs wavelength division demultiplexing on the 32 uplink input optical signals $\lambda'_1, \lambda'_2, \ldots, \lambda'_8, \lambda'_9, \lambda'_{10}, \ldots, \lambda'_{16}, \ldots, \lambda'_{25}, \lambda'_{26}, \ldots, \lambda'_{32}$, and transmits to different 4-channel tunable modules and receivers through different ports; the wavelength division multiplexer-demultiplexer realizes wavelength division multiplexing-demultiplexing of uplink and downlink optical signals of multiple wavelengths, and may be composed of a device such as a thin film filter or a circulator.

As shown in FIG. 4, when the 4-channel tunable modules employ transmitters with less than 8 tuning channels, the 4-channel tunable modules are different modules with small number of module specifications. For example, if the tunable transmitters 1, 2, 3, and 4 are all 4-channel tunable transmitters, transmission of 32 channels of downlink wavelengths and reception of 32 channels of uplink wavelengths can be realized by 4-channel tunable modules of two specifications. For example, in a 4-channel tunable module of specification 1, the tuning channel range of the tunable transmitter 1 is 1 to 4, the tuning channel range of the tunable transmitter 2 is 5 to 8, the tuning channel range of the tunable transmitter 3 is 9 to 12, and the tuning channel range of the tunable transmitter 4 is 13 to 16; in a 4-channel tunable module of specification 2, the tuning channel range of the tunable transmitter 1 is 17 to 20, the tuning channel range of the tunable transmitter 2 is 21 to 24, the tuning channel range of the tunable transmitter 3 is 25 to 28, and the tuning channel range of the tunable transmitter 4 is 29 to 32. In this case, the receiving wavelengths of the receivers and the allocation of the wavelengths by the wavelength division multiplexing-demultiplexing module 1 are changed accordingly, and are not described herein again.

Figure 5:
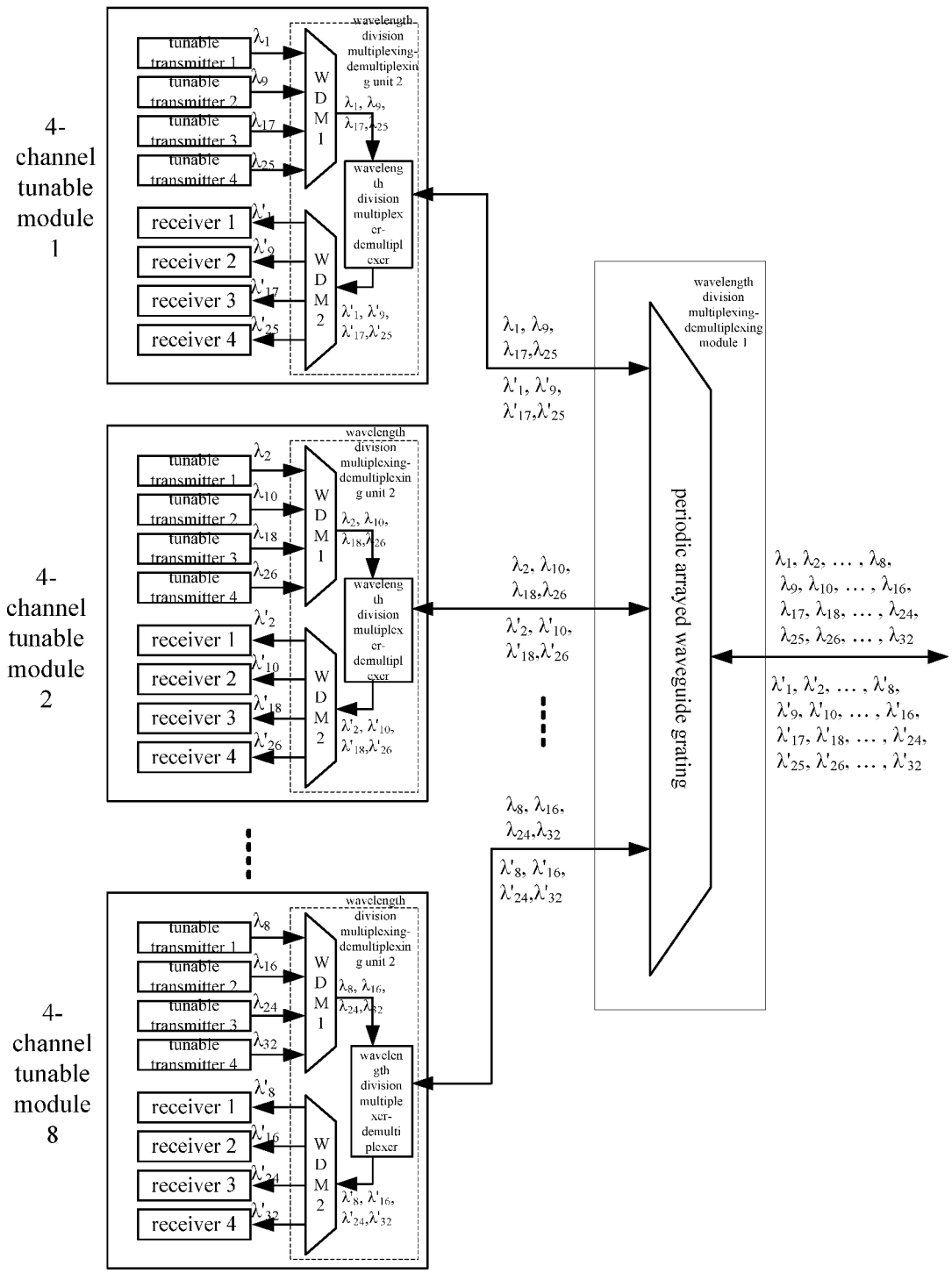
FIG. 5 is an exemplary structural diagram 2 of a passive optical network device of an OLT according to an embodiment of the present disclosure.

FIG. 5 is an exemplary structural diagram 2 of a passive optical network device of an OLT according to an embodiment of the present disclosure. As shown in FIG. 5, the passive optical network device includes eight identical 4-channel tunable modules and a wavelength division multiplexing-demultiplexing module 1, implementing 32-channel downlink wavelengths transmission and 32-channel uplink wavelengths reception with a single PON port.

The 4-channel tunable module is configured to transmit 4 downlink optical signals and receive 4 uplink optical signals, wherein the transmitting wavelengths transmitted by the 4-channel tunable module can be dynamically allocated according to the networking requirements, and the receiving wavelengths transmitted by the 4-channel tunable module is fixedly distributed by the wavelength division multiplexing-demultiplexing module 1 and the wavelength division multiplexing-demultiplexing unit 2. The 4-channel tunable module includes 4 tunable transmitters, 4 receivers, and the wavelength division multiplexing-demultiplexing unit 2, which is a difference from the passive optical network device shown in FIG. 4.

The four tunable transmitters described above employ four kinds of tunable lasers with eight channels that are tunable for a small wavelength tuning range. Within a tunable module, the tunable range of the four kinds of tunable lasers may cover a range of all 32 downlink wavelength channels. For example, for the 32 continuous downlink wavelength channels $\lambda_1, \lambda_2, \ldots, \lambda_8, \lambda_9, \lambda_{10}, \ldots, \lambda_{16}, \ldots, \lambda_{25}, \lambda_{26}, \ldots, \lambda_{32}$, the tuning range of the tunable transmitter 1 in the 4-channel tunable module is $(\lambda_1, \lambda_2, \ldots, \lambda_8)$, that is, the tunable transmitter 1 includes a tunable laser 1 with eight wavelength channels tunable, the tuning range of the tunable transmitter 2 in the 4-channel tunable module is $(\lambda_9, \lambda_{10}, \ldots, \lambda_{16})$, that is, the tunable transmitter 2 includes a tunable laser 2 with eight wavelength channels tunable, and so on, the tuning range of the tunable transmitter 4 in the 4-channel tunable module is $(\lambda_{25}, \lambda_{26}, \ldots, \lambda_{32})$, that is, the tunable transmitter 4 includes a tunable laser 4 with eight wavelength channels tunable. Therefore, optical channel transmission of all 32 downlink wavelength channels can be realized by corresponding wavelength channel configuration for each module using eight 4-channel tunable modules of a same specification. The tunable laser used in the tunable module is an 8-channel tunable laser with small tuning range. For example, the tunable laser can be a tunable DBR, a tunable VCSEL, and a tunable ECL. The tunable lasers 1 through 4 can be multiple discrete tunable lasers or arrayed multi-channel tunable lasers.

The above receiver can use a wide spectrum receiving APD or PIN detector to receive an uplink input wavelength $\lambda'_1, \lambda'_2, \ldots, \lambda'_8, \lambda'_9, \lambda'_{10}, \ldots, \lambda'_{16}, \ldots, \lambda'_{25}, \lambda'_{26}, \ldots,$ or $\lambda'_{32}$ corresponding to the downlink wavelength. The wavelengths received by different receiving channels are distributed by the wavelength division multiplexing-demultiplexing module 1 and the wavelength division multiplexing-demultiplexing unit 2 to corresponding receivers. For example, in the first 4-channel tunable module, the receiver 1 receives $\lambda'_1$, the receiver 2 receives $\lambda'_9$, the receiver 3 receives $\lambda'_{17}$, and the receiver 4 receives $\lambda'_{25}$; in the second 4-channel tunable module, the receiver 1 receives $\lambda'_2$, the receiver 2 receives $\lambda'_{10}$, the receiver 3 receives $\lambda'_{18}$, and the receiver 4 receives $\lambda'_{26}$; and so on; in the eighth 4-channel tunable module, the receiver 4 receives $\lambda'_8$, the receiver 2 receives $\lambda'_{16}$, the receiver 3 receives $\lambda'_{24}$, and the receiver 4 receives $\lambda'_{32}$. Receivers 1 through 4 can be multiple discrete detectors or arrayed multi-channel detectors.

Figure 6A:
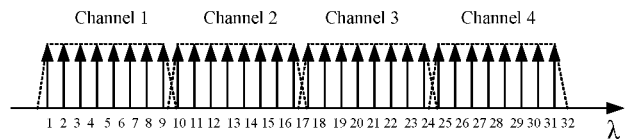
FIG. 6 (a) is a structural diagram of WDM 1 in the exemplary structure diagram 2 of the passive optical network device of the OLT according to an embodiment of the present disclosure.
Figure 6A:
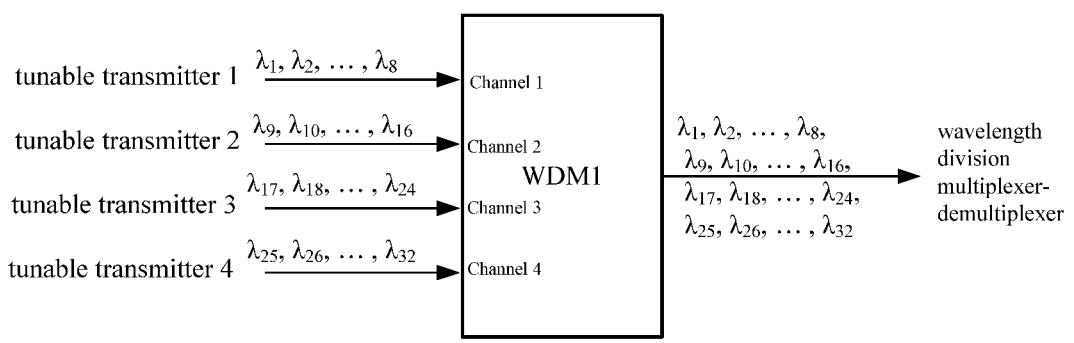
Figure 6B:
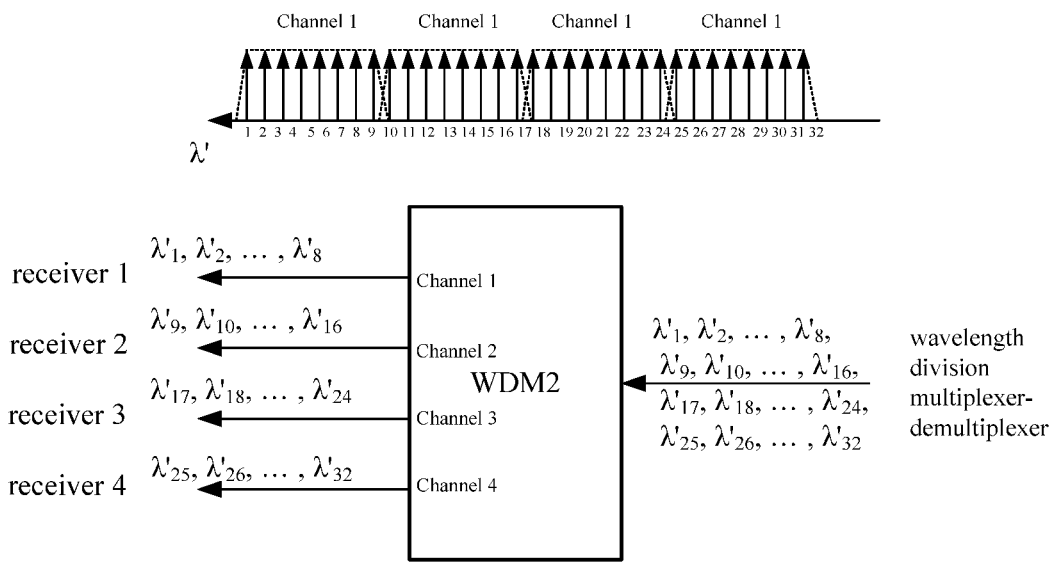

The above 4-channel tunable module may further include a wavelength division multiplexing-demultiplexing unit 2. The wavelength division multiplexing-demultiplexing unit 2 implements wavelength division multiplexing-demultiplexing of uplink and downlink wavelength inside the 4-channel tunable module. The wavelength division multiplexing-demultiplexing unit 2 may include WDM1, WDM2, and a wavelength division multiplexer-demultiplexer. As shown in FIG. 6(*a*), WDM 1 is a 4-channel wavelength division multiplexing device, the channel bandwidth of channel 1 covers $\lambda_1, \lambda_2, \ldots, \lambda_8$, the channel bandwidth of channel 2 covers $\lambda_9, \lambda_{10}, \ldots, \lambda_{16}$, the channel bandwidth of channel 3 covers $\lambda_{17}, \lambda_{18}, \ldots, \lambda_{24}$, and the channel bandwidth of channel 4 covers $\lambda_{25}, \lambda_{26}, \ldots, \lambda_{32}$. Channels 1, 2, 3, and 4 of WDM1 are connected to the tunable transmitters 1, 2, 3, and 4, respectively. The WDM1 performs wavelength division multiplexing on the four wavelengths transmitted by the tunable transmitters in each 4-channel tunable module, and transmits to the wavelength division multiplexer-demultiplexer, the four wavelengths such as the four downlink wavelengths of $\lambda_1, \lambda_9, \lambda_{17}, \lambda_{25}$ in the first 4-channel tunable module, the four downlink wavelengths of $\lambda_2, \lambda_{10}, \lambda_{18}, \lambda_{26}$ in the second 4-channel tunable module, and so on, and the four downlink wavelengths of $\lambda_8, \lambda_{16}, \lambda_{24},$ and $\lambda_{32}$ in the eighth 4-channel tunable module. As shown in FIG. 6(*b*), WDM 2 is a 4-channel wavelength division multiplexing device, the channel bandwidth of channel 1 covers $\lambda'_1, \lambda'_2, \ldots, \lambda'_8$, the channel bandwidth of channel 2 covers $\lambda'_9, \lambda'_{10}, \ldots, \lambda'_{16}$, the channel bandwidth of channel 3 covers $\lambda'_{17}, \lambda'_{18}, \ldots, \lambda'_{24}$, and the channel bandwidth of channel 4 covers $\lambda'_{25}, \lambda'_{26}, \ldots, \lambda'_{32}$. Channels 1, 2, 3, and 4 of WDM2 are connected to receivers 1, 2, 3, and 4, respectively. The WDM2 allocates the plurality of uplink optical wavelengths input from the wavelength division multiplexer-demultiplexer to a corresponding receiver, the plurality of uplink optical wavelengths such as the four uplink wavelengths of $\lambda'_1, \lambda'_9, \lambda'_{17},$ and $\lambda'_{25}$ in the first 4-channel tunable module, the four uplink wavelengths of $\lambda'_2, \lambda'_{10}, \lambda'_{18}, \lambda'_{26}$ in the second 4-channel tunable module, and so on, and the four uplink wavelengths of $\lambda'_8, \lambda'_{16}, \lambda'_{24}, \lambda'_{32}$ in the eighth 4-channel tunable module. The WDM1 can be composed of a thin film filter wavelength division multiplexing device, an arrayed waveguide grating and an optical branching device. The WDM2 can be composed of a thin film filter wavelength division multiplexing device, an arrayed waveguide grating and the like. The wavelength division multiplexer-demultiplexer realizes wavelength division multiplexing-demultiplexing of the uplink and downlink multi-wavelength optical signals, and can be composed of a thin film filter or a circulator.

The multiple optical devices included in the above 4-channel tunable module may be a set of multiple discrete devices, or may be composed of several or a single integrated optical chip(s).

The wavelength division multiplexing-demultiplexing module 1 is a periodic arrayed waveguide grating device that performs wavelength division multiplexing-demultiplexing on the uplink and downlink wavelengths. Channel interval of the periodic arrayed waveguide grating is an interval between adjacent uplink and downlink wavelengths, and the repetition period is 8 uplink or downlink wavelength channels. As shown in FIG. 5, in the downlink direction, 8 groups of downlink wavelength optical signals (four channels of wavelengths, each incremented by 8 channels of wavelengths, forms a group) are input to the channels of periodic arrayed waveguide grating device by eight 4-channel tunable modules, then multiplexed by the periodic arrayed waveguide grating device and transmitted to the ODN network, wherein each group of downlink wavelengths is separated by one channel of wavelength. In the uplink direction, 32 uplink wavelength signals are distributed into 8 groups of wavelengths for corresponding ports and modules by the periodic arrayed waveguide grating, wherein each group of wavelengths includes 4 uplink wavelengths separated by 8 channels of wavelength, and each group of wavelengths is separated by one channel of wavelength. Also, the periodic arrayed waveguide grating multiplexes the downlink wavelengths and the corresponding uplink wavelengths through a same channel by multiplexing wavelengths periodically.

Figure 7:
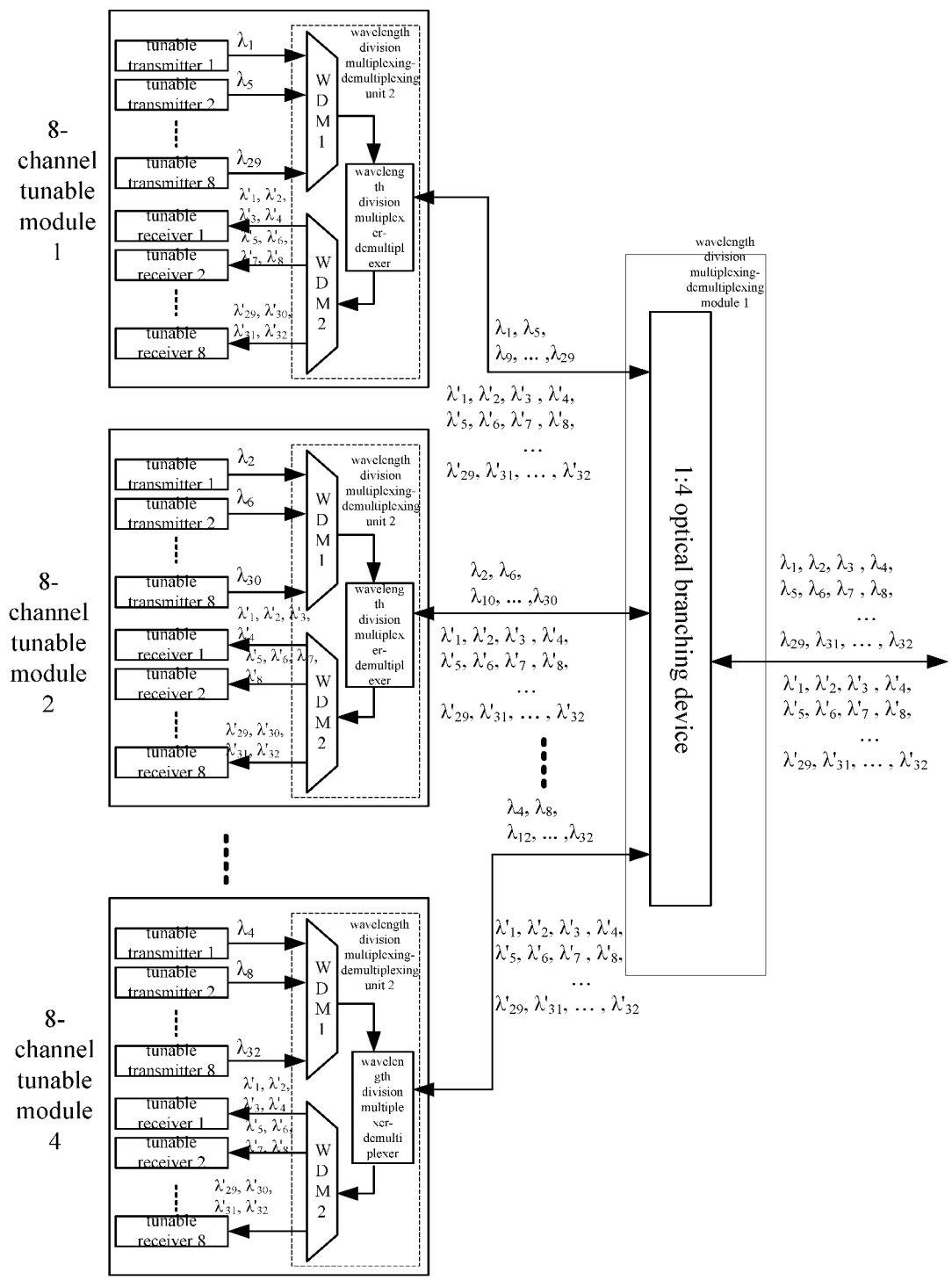
FIG. 7 is an exemplary structural diagram 3 of a passive optical network device of an OLT according to an embodiment of the present disclosure.

FIG. 7 is an exemplary structural diagram 3 of a passive optical network device of an OLT according to an embodiment of the present disclosure. As shown in FIG. 7, the passive optical network device includes four identical 8-channel tunable modules and a wavelength division multiplexing-demultiplexing module 1, implementing 32-channel downlink wavelengths transmission and 32-channel uplink wavelengths reception with a single PON port.

The 8-channel tunable module is configured to transmit 8 downlink optical signals and receive 8 uplink optical signals, wherein the transmitting wavelengths transmitted by the 8-channel tunable module can be dynamically allocated according to the networking requirements, and the receiving wavelengths transmitted by the 8-channel tunable module is fixedly distributed by the wavelength division multiplexing-demultiplexing module 1 and the wavelength division multiplexing-demultiplexing unit 2. A plurality of uplink optical signals are filtered and received by tunable receivers. The 8-channel tunable module includes 8 tunable transmitters, 8 receivers, and the wavelength division multiplexing-demultiplexing unit 2. The difference from the passive optical network device shown in FIG. 5 is that the receivers in the device are tunable receivers.

The eight tunable transmitters described above employ eight kinds of tunable lasers with four channels that are tunable for a small wavelength tuning range. Within a tunable module, the tunable range of the eight kinds of tunable lasers may cover a range of all 32 downlink wavelength channels. For example, for the 32 continuous downlink wavelength channels $\lambda_1, \lambda_2, \ldots, \lambda_8, \lambda_9, \lambda_{10}, \ldots, \lambda_{16}, \ldots, \lambda_{25}, \lambda_{26}, \ldots, \lambda_{32}$, the tuning range of the tunable transmitter 1 in the 8-channel tunable module is $(\lambda_1, \lambda_2, \ldots, \lambda_4)$, that is, the tunable transmitter 1 includes a tunable laser 1 with four wavelength channels tunable, the tuning range of the tunable transmitter 2 in the 8-channel tunable module is $(\lambda_5, \lambda_6, \ldots, \lambda_8)$, that is, the tunable transmitter 2 includes a tunable laser 2 with four wavelength channels tunable, and so on, the tuning range of the tunable transmitter 4 in the 8-channel tunable module is $(\lambda_{29}, \lambda_{30}, \ldots, \lambda_{32})$, that is, the tunable transmitter 8 includes a tunable laser 8 with four wavelength channels tunable. Therefore, optical channel transmission of all 32 downlink wavelength channels can be realized by corresponding wavelength channel configuration for each module using four 8-channel tunable modules of a same specification. The tunable laser used in the tunable module is a 4-channel tunable laser with small tuning range. For example, the tunable laser can be a device such as a tunable DBR, a tunable DBR, a tunable VCSEL, and a tunable ECL. The tunable lasers 1 through 8 can be multiple discrete tunable lasers or arrayed multi-channel tunable lasers.

The above tunable receivers can filter and receive the input multi-wavelength signals, and can be composed of tunable filters and APD or PIN detectors. The wavelength of the optical signals input to the tunable receivers are allocated and determined by the wavelength division multiplexing-demultiplexing module 1 and the wavelength division multiplexing-demultiplexing unit 2, as shown in FIG. 7, after the uplink multi-wavelength signals are allocated by the wavelength division multiplexing-demultiplexing module 1 and the wavelength division multiplexing-demultiplexing unit 2, different uplink wavelength signals are input to different tunable receivers: $\lambda'_1, \lambda'_2, \ldots, \lambda'_4$, are input to the tunable receiver 1, $\lambda'_5, \lambda'_6, \ldots, \lambda'_8$ are input to the tunable reception Machine 2, and so on, $\lambda'_{29}, \lambda'_{30}, \ldots, \lambda'_{32}$ are input to the tunable receiver 8. The tunable receiver can be a receiver with a wide tunable range, for example, a receiver with a tunable range of 32 wavelengths such as $\lambda'_1, \lambda'_2, \ldots, \lambda'_{32}$, or can be a receiver with a small tunable range, for example, the tunable receiver 1 with a tunable range of 4 wavelengths such as $\lambda'_1, \lambda'_2, \ldots, \lambda'_4$, the tunable receiver 2 with a tunable range of 4 wavelengths such as $\lambda'_5, \lambda'_6, \ldots, \lambda'_8$, and so on, and the tunable receiver 8 with a tunable range of 4 wavelengths such as $\lambda'_{29}, \lambda'_{30}, \ldots, \lambda'_{32}$. The tunable receivers configure the tunable wavelength channels which can filter according to network requirements, to filter the input multi-wavelength signals. Then, a detector receives a filtered single uplink wavelength corresponding to the downlink wavelength. Receivers 1 through 8 can be multiple discrete detectors or arrayed multi-channel detectors.

The above wavelength division multiplexing-demultiplexing unit 2 implements wavelength division multiplexing-demultiplexing of uplink and downlink wavelengths inside the 8-channel tunable module, and may include WDM1, WDM2, and a wavelength division multiplexer-demultiplexer. WDM 1 is an 8-channel wavelength division multiplexing device, the channel bandwidth of channel 1 covers $\lambda_1, \lambda_2, \ldots, \lambda_4$, the channel bandwidth of channel 2 covers $\lambda_5, \lambda_6, \ldots, \lambda_8$, and so on, and the channel bandwidth of channel 8 covers $\lambda_{29}, \lambda_{30}, \ldots, \lambda_{32}$. Channels 1, 2, ..., 8 of WDM1 are connected to the tunable transmitters 1, 2, ..., 8, respectively. The WDM1 performs wavelength division multiplexing on the eight wavelengths transmitted by the tunable transmitters in each 8-channel tunable module, and transmits to the wavelength division multiplexer-demultiplexer, the eight wavelengths such as the eight downlink wavelengths of $\lambda_1, \lambda_5, \ldots, \lambda_{29}$ in the first 8-channel tunable module, the right downlink wavelengths of $\lambda_2, \lambda_6, \ldots, \lambda_{30}$ in the second 8-channel tunable module, and so on, and the eight downlink wavelengths of $\lambda_4, \lambda_8, \ldots, \lambda_{32}$ in the eighth 8-channel tunable module. WDM 2 is an 8-channel wavelength division multiplexing device, the channel bandwidth of channel 1 covers $\lambda'_1, \lambda'_2, \ldots, \lambda'_4$, the channel bandwidth of channel 2 covers $\lambda'_5, \lambda'_6, \ldots, \lambda'_8$, and so on, and the channel bandwidth of channel 8 covers $\lambda'_{29}, \lambda'_{30}, \ldots, \lambda'_{32}$. Channels 1, 2, ..., 8 of WDM2 are connected to receivers 1, 2, ..., 8, respectively. The WDM2 allocates the plurality of uplink optical wavelengths input from the wavelength division multiplexer-demultiplexer to a corresponding receiver. The WDM1 can be composed of a thin film filter wavelength division multiplexing device, an arrayed waveguide grating and an optical branching device. The WDM2 can be composed of a thin film filter wavelength division multiplexing device, an arrayed waveguide grating and the like. The wavelength division multiplexer-demultiplexer realizes wavelength division multiplexing-demultiplexing of the uplink and downlink multi-wavelength optical signals, and can be composed of a thin film filter or a circulator.

The multiple optical devices included in the above 4-channel tunable module may be a set of multiple discrete devices, or may be composed of several or a single integrated optical chip(s).

The above wavelength division multiplexing-demultiplexing module 1 is a 1:4 optical branching device that performs wavelength division multiplexing-demultiplexing on the uplink and downlink wavelengths. As shown in FIG.

7, in the downlink direction, 4 groups of downlink wavelength optical signals (eight channels of wavelengths, each incremented by 4 channels of wavelengths, forms a group) are input to the 1:4 optical branching device by four 8-channel tunable modules, then multiplexed by the 1:4 optical branching device and transmitted to the ODN network, wherein each group of downlink wavelengths is separated by one channel of wavelength. In the uplink direction, 32 uplink wavelength signals are distributed by the 1:4 optical branching device to four ports for output, each port contains all 32 uplink wavelength signals. Each group of 32 uplink wavelength signals is input to the corresponding optical modules, demultiplexed by the wavelength division multiplexing-demultiplexing unit 2, filtered by the tunable receiver filters. Then, a filtered wavelength is input to a corresponding detector.

Figures 8, 9:
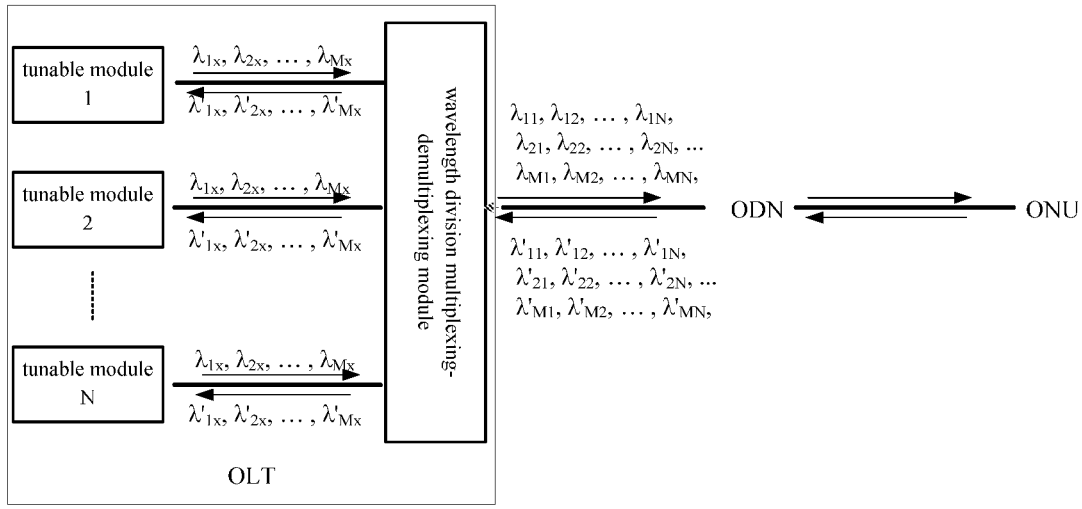
FIG. 8 is a structural diagram of a passive optical network system of an OLT according to an embodiment of the present disclosure.
FIG. 9 is a flowchart of a signal transmission method according to an embodiment of the present disclosure.

A method provided by embodiments of the present disclosure can run on the passive optical network system architecture shown in FIG. 8. FIG. 8 is an exemplary structural diagram of a passive optical network system of the OLT according to the embodiment of the present disclosure. As shown in FIG. 8, the passive optical network system includes an OLT, an ODN, and an ONU.

For a wavelength division multiplexing passive optical network with M×N pairs of uplink and downlink wavelengths, the passive optical network system adopts N tunable modules of a same specification and a wavelength division multiplexing-demultiplexing module at the OLT. The tunable module is configured to transmit the M channels of downlink optical signals and M channels of uplink optical signals. The transmitting wavelengths transmitted by the tunable modules can be dynamically allocated according to the networking requirements, and the receiving wavelengths transmitted by the tunable modules can be fixedly distributed or dynamically allocated according to the networking requirements.

The wavelength division multiplexing-demultiplexing module connects multiple tunable modules to the ODN network, and performs wavelength division multiplexing-demultiplexing on multiple channels of uplink and downlink signals. The wavelength division multiplexing-demultiplexing module and the tunable module are connected by a single fiber or multiple fibers. The wavelength division multiplexing-demultiplexing module may include one or more thin film filters, arrayed waveguide gratings, optical branching devices, circulators, optical switching devices and the like.

In this embodiment, a signal transmission method running in a system architecture is provided. FIG. 9 is a flowchart of a signal transmission method according to an embodiment of the present disclosure. As shown in FIG. 9, the process includes the following steps S902-S904.

At step S902, determine that an optical line terminal OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two.

At step S904, transmit signals according to the determined N tunable modules.

Through the above steps, each tunable module in the OLT is a multi-channel tunable module, and a number of wavelength tuning channels shared by each tunable transmitter in each tunable module are reduced, thus the tuning range of each tunable transmitter is reduced. Additionally, a transmitter with a small wavelength tuning range is used for each of the transmitters, therefore, when performing wavelength configuration on the tunable modules of the OLT, the tuning range may be reduced, an effect of implementing flexible wavelength configuration at a low cost can be realized, and the number of module specifications is also reduced. Further, the above-mentioned multi-channel tunable module device has a high degree of integration, which is advantageous for increasing port density of a system and improving system capacity.

Exemplarily, the OLT may employ N identical tunable modules when the number of tuning channels of the M tunable transmitters of each tunable module is greater than or equal to N and the number of the tuning channels is less than M×N. Through the above steps, when the same tunable modules are used for flexible configuration of the wavelength to reduce the number of module specifications, the tuning range of the tunable module can be reduced, and the effect of implementing flexible wavelength configuration by using the same tunable modules can be realized at a low cost.

Exemplarily, the step of transmitting signals according to the determined N tunable modules may include at least one of: performing wavelength division multiplexing on the M downlink signals transmitted by the M tunable transmitters of each tunable module, and performing wavelength division demultiplexing on the M uplink signals corresponding to the M downlink signals. Through the above steps, the uplink and downlink signals inside the tunable module can be multiplexed and demultiplexed to reduce the number of fibers connected between the tunable module and a wavelength division multiplexing-demultiplexing module to achieve an effect of cost saving.

Exemplarily, the step of performing wavelength division demultiplexing on the M uplink signals corresponding to the M downlink signals may include: protecting, by using an optical switching device, M ports that receive the M uplink signals. For example, in the case where the receiver is a non-tunable receiver, when a channel of a tunable module in the OLT fails (transmitter failure or receiver failure), the transmitting wavelength of a transmitter of another channel in the tunable module may be tuned to the transmitting wavelength of the transmitter of the failed channel; or, the optical switching device may switch the receiver corresponding to the failed transmitter to a receiver corresponding to the transmitter of another channel in the tunable module. For another example, in the case where the receiver is a tunable receiver, the optical switching device may not be used, that is, when a channel of a tunable module in the OLT fails, the transmitting wavelength of a transmitter of another channel in the tunable module may be tuned to the transmitting wavelength of the transmitter of the failed channel; or, the receiving wavelength of a receiver corresponding to the transmitter of another channel in the tunable module may be tuned to the receiving wavelength of the receiver of the failed channel.

Through the above steps, when an optical transceiving link of a certain tunable module in the OLT device fails, another optical transceiving link (a channel of the M channels) of the current tunable module can be enabled without replacing the current tunable module, to restore optical connection between the OLT and the ONU. As such, the wavelength signal transmitted on the failed channel can be transmitted on other channels of the tunable module, ensuring the reliability of the transmission, and greatly improving the utilization of the multi-channel tunable module and reducing the operating cost. Moreover, as compared to port protection by double device, the port protection by single device reduces the need for devices and optical components and further reduces operating cost.

Exemplarily, the step of transmitting signals according to the determined N tunable modules may further include: performing wavelength division multiplexing-demultiplexing on the downlink signals after the wavelength division multiplexing and the uplink signals before the wavelength division demultiplexing.

Exemplarily, the step of transmitting signals according to the determined N tunable modules may further include: performing wavelength division multiplexing-demultiplexing on the uplink and downlink signals of the N tunable modules.

Exemplarily, upon tunable reception of the M uplink signals corresponding to the M downlink signals, port protection is performed between the N tunable modules by the optical branching device. Through the above steps, when an optical transceiving link of a certain multi-channel tunable module in the OLT device fails, an optical transceiving link of another multi-channel tunable module (any module other than the failed tunable module) of the current OLT device can be enabled without replacing the tunable module, to restore optical connection between the OLT and the ONU. As such, other optical transceiving links of the failed multi-channel tunable module can continue to work, greatly improving the utilization of the multi-channel tunable module and reducing the operating cost. Moreover, as compared to port protection by double device, the port protection by single device reduces the need for devices and optical components and further reduces operating cost.

Exemplarily, the step of transmitting signals according to the determined N tunable modules may include: filtering M received uplink signals corresponding to M downlink signals transmitted by the M tunable transmitters in the tunable module. Through the above steps, unwanted signals mixed in the received uplink signals may be filtered out, and accuracy of reception may be improved.

Figure 10:
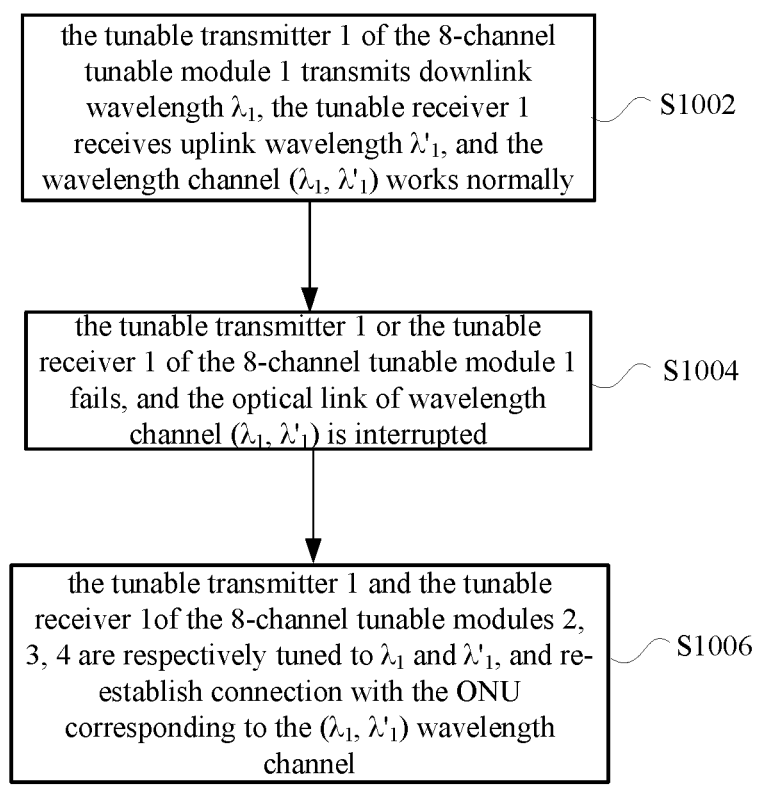
FIG. 10 is a flowchart of a port protection method in the exemplary structure diagram 3 of the passive optical network system of the OLT according to an embodiment of the present disclosure.

The passive optical network device shown in FIG. 7 not only has the advantages of implementing flexible wavelength configuration of the WDM-PON OLT device by using tunable optical modules of one specification, which employs tunable laser devices with a small wavelength tuning range and low cost, but also enables a capability of port protection by single device in a passive optical network system using the passive optical network device, since the wavelength division multiplexing-demultiplexing module 1 includes an optical branching device. Taking the wavelength channel $(\lambda_1, \lambda'_1)$ as an example, the steps of a port protection method is shown in FIG. 10, the method includes steps S1002 and S1006.

At step S1002, the tunable transmitter 1 of the 8-channel tunable module 1 transmits downlink wavelength $\lambda 1$, the tunable receiver 1 receives uplink wavelength $\lambda'_1$, and the wavelength channel $(\lambda_1, \lambda'_1)$ works normally.

At step S1004, the tunable transmitter 1 or the tunable receiver 1 of the 8-channel tunable module 1 fails, and the optical link of wavelength channel $(\lambda_1, \lambda'_1)$ is interrupted.

At step S1006, the tunable transmitter 1 and the tunable receiver 1 of the 8-channel tunable modules 2, 3, 4 are respectively tuned to $\lambda_1$ and $\lambda'_1$, and re-establish connection with the ONU corresponding to the $(\lambda_1, \lambda'_1)$ wavelength channel.

Figure 11:
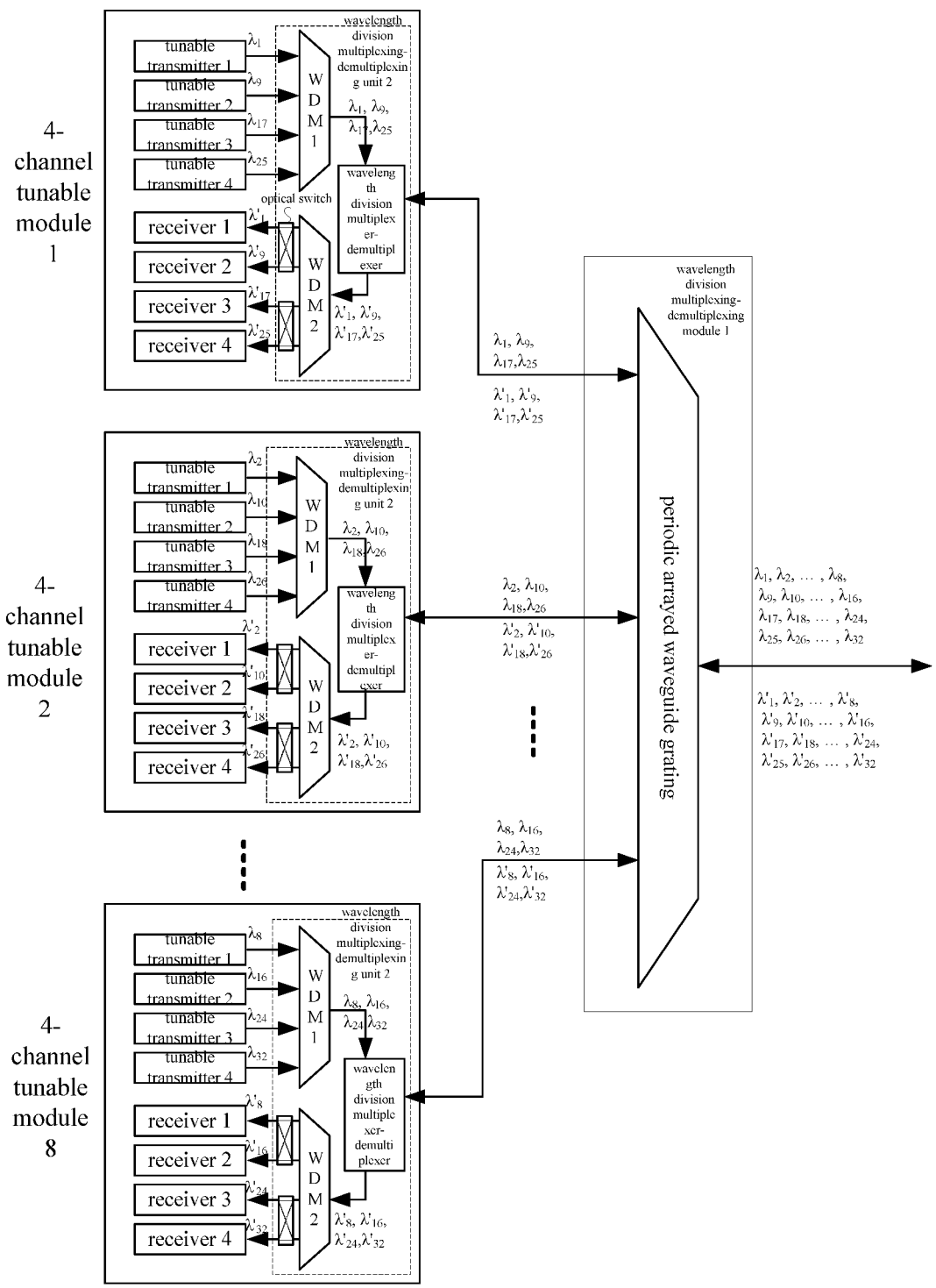
FIG. 11 is an exemplary structural diagram 4 of a passive optical network device of an OLT according to an embodiment of the present disclosure.
Figure 12:
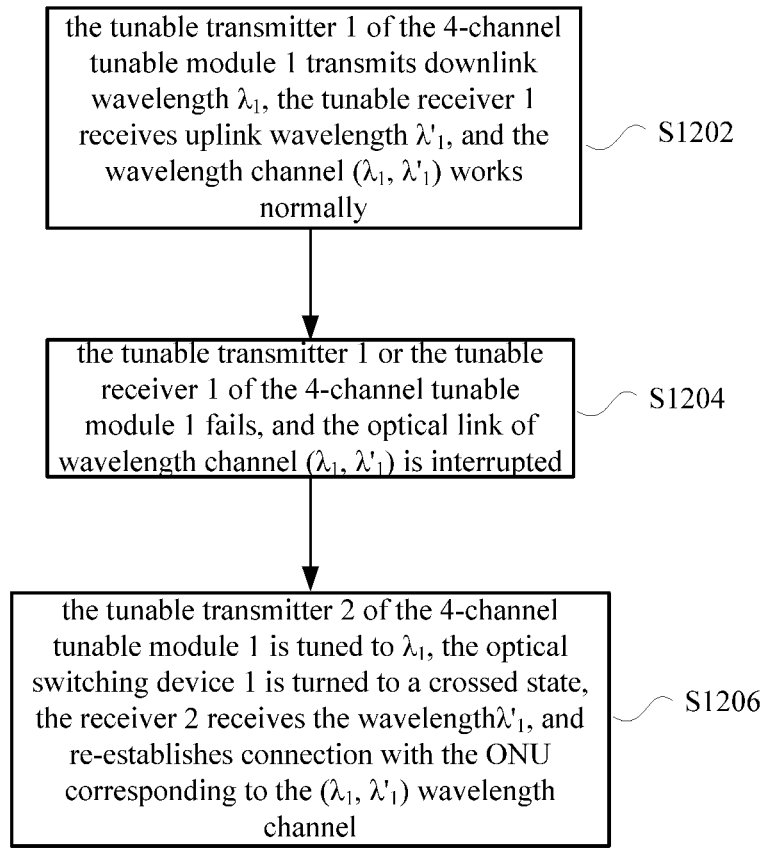
FIG. 12 is a flowchart of a port protection method in the exemplary structure diagram of the passive optical network system of the OLT according to an embodiment of the present disclosure.

FIG. 11 is an exemplary structural diagram 4 of a passive optical network device of an OLT according to an embodiment of the present disclosure. As shown in FIG. 11, the difference between the device and the device shown in FIG. 5 is that: in the transmitting direction, and in the 4-channel tunable optical module, the tunable transmitter 1 and the tunable transmitter 2 adopts a 16-channel tunable laser with a tunable range of $(\lambda_1, \lambda_1, \ldots, \lambda_{16})$, and the tunable transmitter 3 and the tunable transmitter 4 adopts a 16-channel tunable laser with a tunable range of $(\lambda_{17}, \lambda_{18}, \ldots, \lambda_{32})$. In the receiving direction, two 2×2 optical switching devices are added to the WDM2 device within the wavelength division multiplexing-demultiplexing unit 2, the added optical switching devices connect the receivers 1, 2 to the WDM2 device ports 1, 2, and connect the receivers 3, 4 to the WDM2 device ports, respectively. The passive optical network system using the device can realize port protection between the channel 1 and the channel 2, the channel 3 and the channel 4 within the 4-channel tunable module by switching the optical switching devices and adjusting the transmitting wavelength of the tunable transmitter. Taking the wavelength channel $(\lambda_1, \lambda'_1)$ of the 4-channel tunable module 1 as an example, the port protection method flowchart is shown in FIG. 12, the method includes the following steps S1202 to S1206.

At step S1202, the tunable transmitter 1 of the 4-channel tunable module 1 transmits downlink wavelength $\lambda_1$, the tunable receiver 1 receives uplink wavelength $\lambda'_1$, and the wavelength channel $(\lambda_1, \lambda'_1)$ works normally.

At step S1204, the tunable transmitter 1 or the tunable receiver 1 of the 4-channel tunable module 1 fails, and the optical link of wavelength channel $(\lambda_1, \lambda'_1)$ is interrupted.

At step S1206, the tunable transmitter 2 of the 4-channel tunable module 1 is tuned to $\lambda_1$, the optical switching device 1 is turned to a crossed state, the receiver 2 receives the wavelength $\lambda'_1$, and re-establishes connection with the ONU corresponding to the $(\lambda_1, \lambda'_1)$ wavelength channel.

An embodiment of the present disclosure further provides a signal transmission device, which is configured to implement the foregoing embodiments and exemplary implementations. Contents that have been described will not be repeated again. As used herein, the term "module" may refer to software, hardware or a combination thereof configured to implement a predetermined function. Although the devices described in the following embodiments are implemented in software, a hardware implementation or a combined implementation of software and hardware is also possible and could be contemplated.

Figure 13:
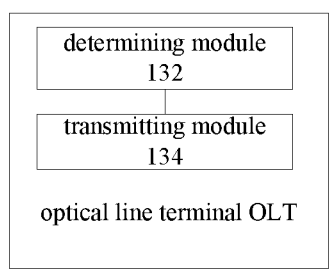
FIG. 13 is a block diagram illustrating the structure of a signal transmission device according to an embodiment of the present disclosure.

FIG. 13 is a structural block diagram of a signal transmission device according to an embodiment of the present disclosure. As shown in FIG. 13, the device is located in an OLT, and includes a determining module 132 and a transmitting module 134.

The determining module 132 is configured to determine that the OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two.

The transmitting module 134 is connected to the determining module 134 and configured to transmit signals according to the determined N tunable modules.

It should be noted that the above modules may be implemented by software or hardware. For the hardware implementation, the foregoing may be implemented by (but not limited to) a same processor or different processors.

An embodiment of the present disclosure further provides a tunable module, including: M tunable transmitters, the number of tuning channels of the M tunable transmitters is greater than or equal to two and the number of the tuning channels is less than M×N, wherein N and M are integers greater than or equal to two.

In an exemplary embodiment, the tunable module may further include: M receivers, configured to receive M uplink signals corresponding to M downlink signals transmitted by the M tunable transmitters in the tunable module.

In an exemplary embodiment, the tunable module may further include: a wavelength division multiplexing-demultiplexing unit, which includes: a first wavelength division multiplexer configured to perform wavelength division multiplexing on the M downlink signals transmitted by the M tunable transmitters, and a second wavelength division multiplexer configured to perform wavelength division demultiplexing on the M uplink signals corresponding to the M downlink signals.

For the structure of the tunable module provided in this embodiment, reference may be made to the description of the foregoing embodiments, and thus no further details are provided herein. It should be noted that the tunable module provided in this embodiment may also be disposed at the ONU.

An embodiment further provides a storage medium. In this embodiment, the above storage medium may be configured to store program code for performing the following steps S1 and S2.

At step S1, determine that an optical line terminal OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two.

At step S2, transmit signals according to the determined N tunable modules.

Exemplarily, the storage medium may further be configured to store program code for performing the following step S1.

At step S1, the N tunable modules are the same when the number of tuning channels of the M tunable transmitters of each tunable module is greater than or equal to N and the number of the tuning channels is less than M×N.

Exemplarily, the storage medium may further be configured to store program code for performing the following step: the step of transmitting signals according to the determined N tunable modules includes at least one of: performing wavelength division multiplexing on the M downlink signals transmitted by the M tunable transmitters of each tunable module, and performing wavelength division demultiplexing on the M uplink signals corresponding to the M downlink signals.

Exemplarily, the storage medium may be further configured to store program code for performing the following step: the step of performing wavelength division demultiplexing on the M uplink signals corresponding to the M downlink signals includes: protecting, by using an optical switching device, M ports that receive the M uplink signals.

Exemplarily, the storage medium may be further configured to store program code for performing the following step: the step of transmitting signals according to the determined N tunable modules further includes: performing wavelength division multiplexing-demultiplexing on the downlink signals after the wavelength division multiplexing and the uplink signals before the wavelength division demultiplexing.

Exemplarily, the storage medium may be further configured to store program code for performing the following step: the step of transmitting signals according to the determined N tunable modules further includes: performing wavelength division multiplexing-demultiplexing on the uplink and downlink signals of the N tunable modules.

Exemplarily, the storage medium may further be configured to store program code for performing the following step: performing port protection between the N tunable modules, by an optical branching device, upon tunable reception of the M uplink signals corresponding to the M downlink signals.

In this embodiment, the foregoing storage medium may include, but not limited to, a USB flash drive, a Read-Only Memory (ROM), a Random Access Memory (RAM), a mobile hard disk, a magnetic disk, or an optical disk, or any media that can store program code.

In an embodiment, a processor executes according to the stored program code in the storage medium to perform steps of: determining that an optical line terminal OLT includes N tunable modules, wherein each of the N tunable modules include M tunable transmitters, the number of tuning channels of the M tunable transmitters is greater than or equal to two and the number of the tuning channels is less than M×N, wherein N and M are integers greater than or equal to two; and transmitting signals according to the determined N tunable modules.

In an embodiment, the processor may execute according to the stored program code in the storage medium to perform a step of: the N tunable modules are the same when the number of tuning channels of the M tunable transmitters of each tunable module is greater than or equal to N and the number of the tuning channels is less than M×N.

In an embodiment, the processor may execute according to the stored program code in the storage medium to perform a step of: the step of transmitting signals according to the determined N tunable modules includes at least one of: performing wavelength division multiplexing on the M downlink signals transmitted by the M tunable transmitters of each tunable module, and performing wavelength division demultiplexing on the M uplink signals corresponding to the M downlink signals.

In an embodiment, the processor may execute according to the stored program code in the storage medium to perform a step of: the step of performing wavelength division demultiplexing on the M uplink signals corresponding to the M downlink signals includes: protecting, by using an optical switching device, M ports that receive the M uplink signals.

In an embodiment, the processor may execute according to the stored program code in the storage medium to perform a step of: the step of transmitting signals according to the determined N tunable modules further includes: performing wavelength division multiplexing-demultiplexing on the downlink signals after the wavelength division multiplexing and the uplink signals before the wavelength division demultiplexing.

In an embodiment, the processor may execute according to the stored program code in the storage medium to perform a step of: the step of transmitting signals according to the determined N tunable modules further includes: performing wavelength division multiplexing-demultiplexing on the uplink and downlink signals of the N tunable modules.

In an embodiment, the processor may execute according to the stored program code in the storage medium to perform a step of: performing port protection between the N tunable modules by an optical branching device upon tunable reception of the M uplink signals corresponding to the M downlink signals.

The above are exemplary embodiments of the present disclosure, and the tunable module may also adopt M tunable transmitters with different numbers of tunable wavelength channels.

For examples in this embodiment, reference may be made to the examples described in the foregoing embodiments and exemplary implementations, and details are not described herein again.

Those of ordinary skill in the art will appreciate that all or some of the steps, systems, and functional blocks/units of the methods disclosed above may be implemented as software, firmware, hardware, and suitable combinations thereof. In a hardware implementation, the division between functional modules/units mentioned in the above description does not necessarily correspond to the division of physical components; for example, a physical component may have multiple functions, or a function or step may be performed by several physical components operating together. Some or all of the components may be implemented as software executed by a processor, such as a digital signal processor or a microprocessor, or as hardware, or as an integrated circuit, such as an disclosure specific integrated circuit. Such software may be distributed on a machine-readable medium, such as a computer-readable medium, which may include computer storage media (or non-transitory media) and communication media (or transitory media). As is well known to those of ordinary skill in the art, the term computer storage medium includes volatile and nonvolatile, removable and non-removable media implemented in any method or technology for storing information (such as computer readable instructions, data structures, program modules, or other data). Computer storage media includes, but is not limited to, RAM, ROM, EEPROM, flash memory or other memory technology, CD-ROM, digital versatile disc (DVD) or other optical disc storage, magnetic cassette, magnetic tape, magnetic disk storage or other magnetic storage device, or any other medium that may configured to store desired information and that can be accessed by a computer. Moreover, it is well known to those of ordinary skill in the art that communication media typically include computer readable instructions, data structures, program modules, or other data in a modulated data signal, such as a carrier wave or other transmission mechanism, and can include any information transfer media.

The above description is merely exemplary embodiments of the present disclosure, and is not intended to limit the present disclosure. For those skilled in the art, various changes and modifications may be made to the present disclosure. Any modifications, equivalent substitutions, improvements made within the scope of this disclosure are intended to be included within the scope of the present disclosure.

INDUSTRIAL APPLICABILITY

Embodiments of the present disclosure provide an optical line terminal, a signal transmission method, and a device, which can achieve the effect of implementing flexible wavelength configuration of the tunable modules at a low cost. Additionally, the multi-channel tunable module device has a high degree of integration, which is advantageous for increasing port density of a system and improving system capacity.

What is claimed is:

1. An optical line terminal (OLT), applied to a wavelength division multiplexing passive optical network with M×N pairs of uplink and downlink wavelengths, comprising: N tunable modules, each of the N tunable modules comprises M tunable transmitters, the number of tuning channels of the M tunable transmitters is greater than or equal to two and the number of the tuning channels is less than M×N, wherein N and M are integers greater than or equal to two;
    each tunable transmitter includes a tunable laser, wherein M tunable lasers of M tunable transmitters employs at least two kinds of tunable lasers with a small tuning range of wavelength, and a number of tuning channels of each kind the tunable lasers is greater than or equal to 2 and less than M×N, and wherein, a sum of tunable ranges of the at least two kinds of tunable lasers is greater than or equal to a range of all downlink wavelength channels.

2. The OLT of claim 1, wherein the N tunable modules are the same, and wherein the number of tuning channels of the M tunable transmitters of each tunable module is greater than or equal to N and the number of the tuning channels is less than M×N.

3. The OLT of claim 1, wherein each of the tunable modules further comprises: M receivers configured to receive M uplink signals corresponding to M downlink signals transmitted by the M tunable transmitters in the tunable module.

4. The OLT of claim 3, wherein the tunable module further comprises a wavelength division multiplexing-demultiplexing unit, comprising:
    a first wavelength division multiplexer configured to perform wavelength division multiplexing on the M downlink signals transmitted by the M tunable transmitters, and
    a second wavelength division multiplexer configured to perform wavelength division demultiplexing on the M uplink signals corresponding to the M downlink signals.

5. The OLT of claim 4, wherein the second wavelength division multiplexer comprises: an optical switching device configured to provide protection for M ports.

6. The OLT of claim 4, wherein the wavelength division multiplexing-demultiplexing unit further comprises a wavelength division multiplexer-demultiplexer configured to perform wavelength division multiplexing-demultiplexing on the downlink signals after the wavelength division multiplexing and the uplink signals before the wavelength division demultiplexing, wherein the wavelength division multiplexer-demultiplexer is connected to the first wavelength division multiplexer and the second wavelength division multiplexer.

7. The OLT of claim 3, wherein the OLT further comprises a wavelength division multiplexing-demultiplexing module configured to perform wavelength division multiplexing-demultiplexing on the uplink and downlink signals of the N tunable modules, wherein the wavelength division multiplexing-demultiplexing module is connected to the N tunable modules.

8. The OLT of claim 7, wherein the wavelength division multiplexing-demultiplexing module comprises: an optical branching device configured to perform port protection between the N tunable modules, wherein the M receivers are tunable receivers.

9. A signal transmission method, comprising steps of:
    determining that an optical line terminal (OLT) comprises N tunable modules, wherein each of the N tunable modules comprise M tunable transmitters, the number of tuning channels of the M tunable transmitters is greater than or equal to two and the number of the tuning channels is less than M×N, wherein N and M are integers greater than or equal to two, and wherein each tunable transmitter includes a tunable laser, M tunable lasers of M tunable transmitters employs at least two kinds of tunable lasers with a small tuning range of wavelength, a number of tuning channels of each kind the tunable lasers is greater than or equal to 2 and less than M×N, and a sum of tunable ranges of the at least two kinds of tunable lasers is greater than or equal to a range of all downlink wavelength channels; and transmitting signals according to the determined N tunable modules.

10. The method of claim 9, wherein the N tunable modules are the same when the number of tuning channels of the M tunable transmitters of each tunable module is greater than or equal to N and the number of the tuning channels is less than M×N.

11. The method of claim 9, wherein the step of transmitting signals according to the determined N tunable modules comprises at least one of:

performing wavelength division multiplexing on the M downlink signals transmitted by the M tunable transmitters of each tunable module, and performing wavelength division demultiplexing on the M uplink signals corresponding to the M downlink signals.

12. The method of claim 11, wherein the step of performing wavelength division demultiplexing on the M uplink signals corresponding to the M downlink signals comprises:

protecting, by using an optical switching device, M ports that receive the M uplink signals.

13. The method of claim 11, wherein the step of transmitting signals according to the determined N tunable modules further comprises:

performing wavelength division multiplexing-demultiplexing on the downlink signals after the wavelength division multiplexing and the uplink signals before the wavelength division demultiplexing.

14. The method of claim 10, wherein the step of transmitting signals according to the determined N tunable modules further comprises:

performing wavelength division multiplexing-demultiplexing on the uplink and downlink signals of the N tunable modules.

15. The method of claim 14, further comprising:

performing, by an optical branching device, port protection between the N tunable modules upon tunable reception of the M uplink signals corresponding to the M downlink signals.

16. A tunable module, comprising:

M tunable transmitters, the number of tuning channels of the M tunable transmitters is greater than or equal to two and the number of the tuning channels is less than M×N, wherein N and M are integers greater than or equal to two, and wherein each tunable transmitter includes a tunable laser, M tunable lasers of M tunable transmitters employs at least two kinds of tunable lasers with a small tuning range of wavelength, a number of tuning channels of each kind the tunable lasers is greater than or equal to 2 and less than M×N, and a sum of tunable ranges of the at least two kinds of tunable lasers is greater than or equal to a range of all downlink wavelength channels.

* * * * *